United States Patent [19]

van Cromvoirt

[11] 4,260,065

[45] Apr. 7, 1981

[54] UNIT LIQUID CUP

[75] Inventor: Johannes A. M. van Cromvoirt, Waalwijk, Netherlands

[73] Assignee: Aloysius Johannes Baptist Aarts, Waalwijk, Netherlands

[21] Appl. No.: 45,132

[22] Filed: Aug. 4, 1979

[30] Foreign Application Priority Data

Jun. 8, 1978 [NL] Netherlands .......................... 7806260
May 21, 1979 [NL] Netherlands .......................... 7903998

[51] Int. Cl.³ ............................................. B65D 17/40
[52] U.S. Cl. ........................................ 215/2; 315/32
[58] Field of Search ...................... 215/2, 32; 222/541; 220/307

[56] References Cited

U.S. PATENT DOCUMENTS

| 862,537 | 8/1907 | Browne | 215/2 |
|---|---|---|---|
| 2,642,911 | 6/1953 | Shazor | 215/2 X |
| 2,742,202 | 4/1956 | Dresden | 222/541 |
| 3,272,366 | 9/1966 | Ikeda | 215/2 |
| 3,902,617 | 9/1975 | Valyi | 215/2 |
| 4,131,211 | 12/1978 | Corbic | 215/2 |
| 4,134,511 | 1/1979 | Deussen | 215/32 |

FOREIGN PATENT DOCUMENTS

| 578974 | 7/1959 | Canada | 220/307 |
|---|---|---|---|
| 858334 | 12/1970 | Canada | 220/307 |
| 2129736 | 12/1971 | Fed. Rep. of Germany | 215/2 |

Primary Examiner—Donald F. Norton
Attorney, Agent, or Firm—Cantor and Singer

[57] ABSTRACT

An injection moulded liquid cup comprising a container whose one end is sealed by a rupturable cap connected to the container via a rupturable tear seam.

3 Claims, 1 Drawing Figure

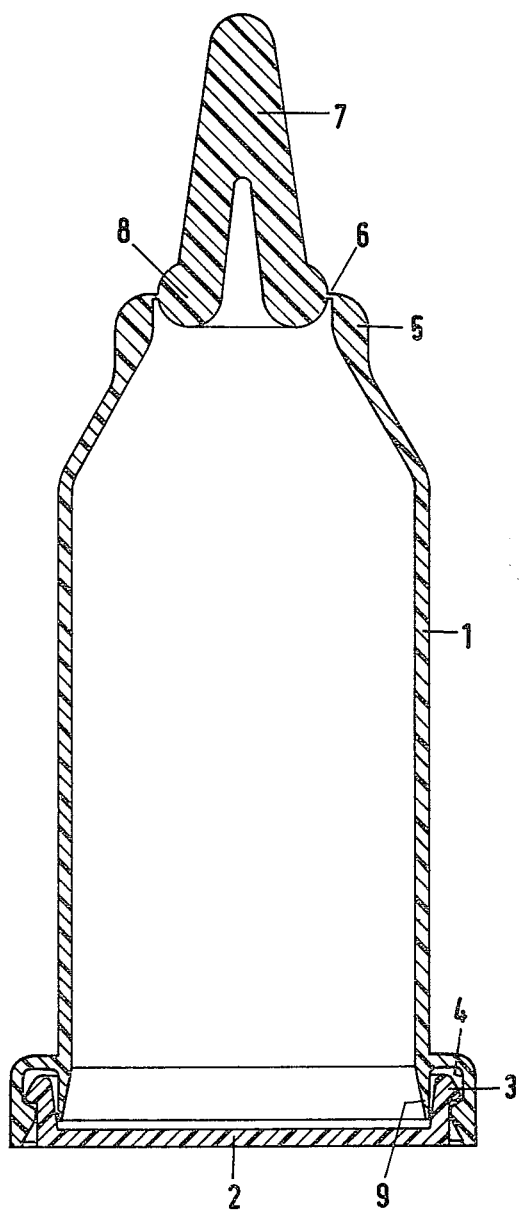

UNIT LIQUID CUP

The invention relates to a unit liquid cup.

It is known to package tablets and the like products as separate units by means of so-called press-through strips. This has not only the advantage that there is no danger of contamination, but moreover that as a result a quicker operation in institutions such as hospitals is promoted. Furthermore the chance of errors is reduced.

It is the object of the present invention to meet the requirements of such a unit package for liquid substances such as medicines.

To this effect the unit liquid cup consists of a container the one end of which is provided with a cover, while the other end is closed by a rupturable cap connected via a rupturable tear seam to the container.

In order to ensure a convenient and adequate separation between the rupturable cap and the container, the container wall and/or the rupturable cap may be thickened adjacent the rupturable or tear seam. A further guarantee for a convenient separation is obtained by designing the wall of the rupturable cap with a larger thickness than the wall of the container. Possibly the rupturable cap may also be of solid design.

In order to enable a convenient and undisturbed drinking, the substantially cylindrical container may have a constricted design towards the rupturable tear seam, the transition of the cylindrical wall of the container towards the constricted portion showing a uniform flowing pattern. As a result it is likewise attained that a proper emptying of the cup is possible, even when viscous liquid is present therein.

To avoid unauthorized opening of the cover, the container at the cover side may be fitted with an undercut groove for coaction with a correspondingly designed peripheral edge of the cover.

In order to ensure a proper closure, the container at the cover side may be extended with a portion reducing in cross section, adapted for coaction with the inner side of the peripheral edge of the cover.

The unit liquid cup according to the invention has the additional advantage that it can be filled, closed and labeled in the pharmacy, so that the further distribution can be substantially facilitated and as a result possible errors may be reduced.

The invention further relates to a method of manufacturing means of mating die portions through injection moulding of a liquid cup comprising a container the one end of which is closed by a rupturable cap connected via a rupturable or tear seam to the container, while the other, open end is adapted to be closed by a cover, which method is characterized in that the polypropylene container or similar synthetic container inert to medicinal liquids is injected from the top end of the rupturable cap and that the space recessed in the die for forming the rupturable cap has such a volume that said space during the filling of the mould serves as antechamber.

It is observed that the use of an antechamber is known per se in the injection moulding art, but the antechamber room does not form part of the product to be formed.

One embodiment of the unit liquid cup will be described, by way of example, with reference to the accompanying drawing, showing a longitudinal section.

According to the drawing a unit liquid cup is provided with a cylindrical polypropylene container 1, the one lower end of which is closed by a cover 2. As shown in the drawing, the shell surface of the cover is provided with a projecting edge 3 which is adapted to snap in an undercut groove 4 of the container.

The container end disposed opposite to the cover has a conical design with a thickened portion 5 at the free end edge. The latter feature enables a convenient separation of a rupturable cap 7 connected to the container through a rupturable tear seam 6. Said rupturable cap which has a substantially thicker wall relatively to the container wall is likewise provided with an edge thickening 8. It is observed that the volume of the rupturable cap is such that during the manufacture of the container through injection moulding, wherein injection takes place via the top end of the rupturable cap, the space recessed in the die assembly for forming the rupturable cap may serve as antechamber for the pressure build-up required for filling the mould cavity for the container via the slot bounding the rupturable seam.

As a further feature of the unit liquid cup according to the invention it may be considered that the end of the cylindrical container facing towards the cover is fitted with a portion or edge 9 having a wall thickness reducing towards the cover. The edge 9 is so designed that it may coact with the inner side of the peripheral wall of the cover in sealing relationship.

It is observed that within the scope of the inventive idea a great many variations are possible. For instance the container, instead of cylindrical, may for instance also be conical; the rupturable cap may be solid and the cover may be connected to the container in a manner different from the one shown. However it is important that the cover shown cannot be removed from the container without leaving traces. Furthermore the shape of the container and the rupturable cap in the embodiment shown are so chosen that the rupturable cap can be easily removed by hand from the container, whereafter the container can be completely emptied without spilling.

I claim:

1. An injection moulded unit liquid cup comprising a substantially cylindrical container being open at one end and having a cover affixed thereto, said cylindrical container tapering at the other end thereof to a cylindrical end portion of lesser diameter and greater wall thickness, and a substantially conical cap having a bead at the larger diameter end thereof and integrally connected to said container at said other end by means of a rupturable tear seam joining said bead and said container, the wall of said cap being thicker than the wall of said container at any part thereof.

2. A unit liquid cup according to claim 1, wherein the container is fitted at said one end with an undercut groove adapted to coact with a correspondingly designed peripheral edge of the cover.

3. A unit liquid cup according to claim 2, wherein the container is extended at said one end with a portion tapering in cross section, adapted for coaction with the inner side of the peripheral edge of the cover.

* * * * *

UNITED STATES PATENT AND TRADEMARK OFFICE
CERTIFICATE OF CORRECTION

PATENT NO. : 4,260,065

DATED : April 7, 1981

INVENTOR(S) : Johannes A.M. van Cromvoirt

It is certified that error appears in the above-identified patent and that said Letters Patent are hereby corrected as shown below:

On the cover page, Item [22] filed: delete "Aug.4, 1979" and substitute therefor --June 4, 1979--

Signed and Sealed this

Thirtieth Day of June 1981

[SEAL]

Attest:

RENE D. TEGTMEYER

Attesting Officer  Acting Commissioner of Patents and Trademarks